No. 864,469. PATENTED AUG. 27, 1907.
A. L. JOHNSON.
GRAIN DRILL.
APPLICATION FILED MAR. 27, 1907.
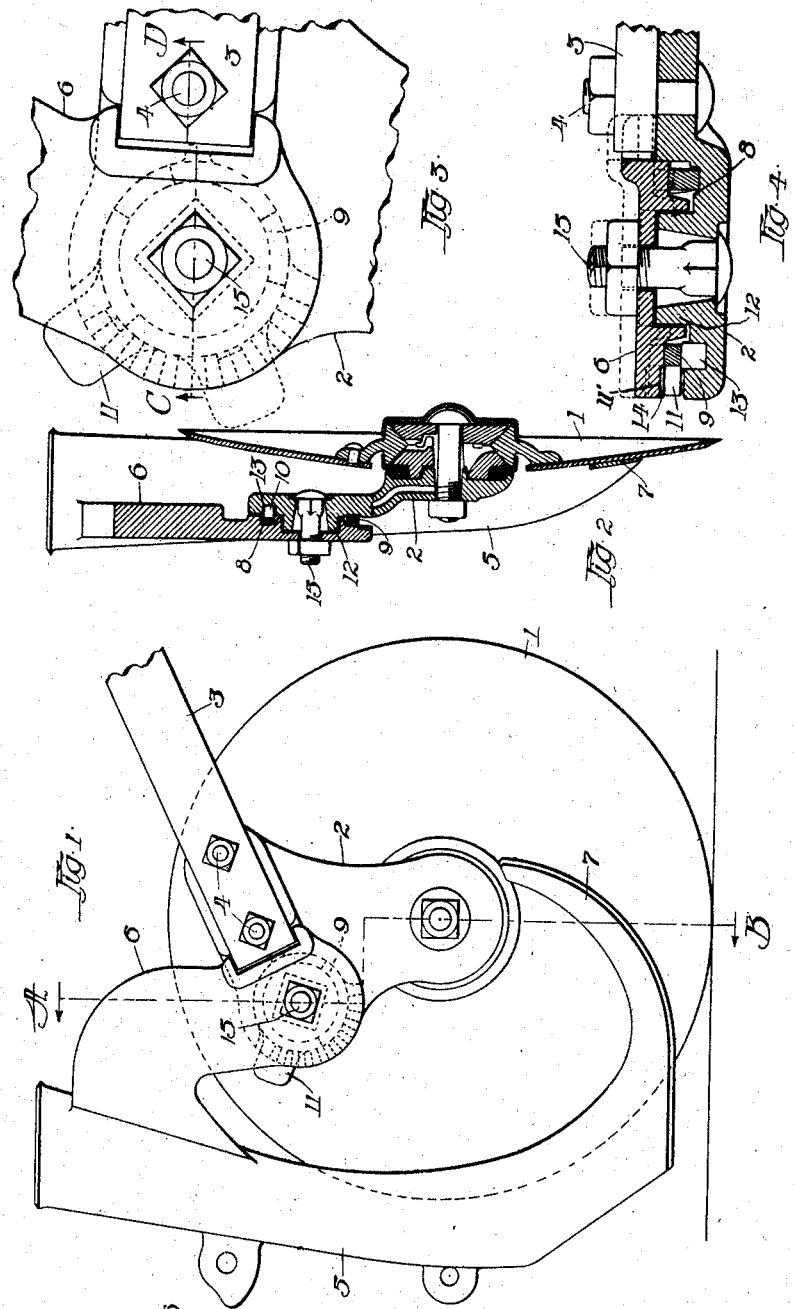
Witnesses:
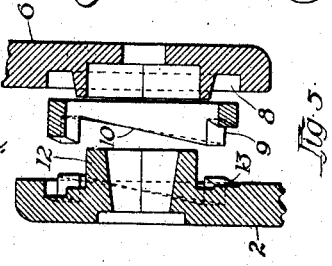 
Inventor:
Andrew L. Johnson
By C.W. Burgess
Attorney.

UNITED STATES PATENT OFFICE.

ANDREW L. JOHNSON, OF HAMILTON, ONTARIO, CANADA, ASSIGNOR TO INTERNATIONAL HARVESTER COMPANY, A CORPORATION OF NEW JERSEY.

GRAIN-DRILL.

No. 864,469.  Specification of Letters Patent.  Patented Aug. 27, 1907.

Application filed March 27, 1907. Serial No. 364,899.

*To all whom it may concern:*

Be it known that I, ANDREW L. JOHNSON, a citizen of the United States, residing at Hamilton, in the county of Wentworth, Province of Ontario, and Dominion of Canada, have invented certain new and useful Improvements in Grain-Drills, of which the following is a specification.

My invention relates to grain drills, and particularly to that type having rotatable disk furrow openers in combination with seed tubes and scraper devices suitably mounted; the object being to provide means whereby the parts may be laterally and relatively adjusted. I attain these objects by the mechanism illustrated in the accompanying drawing, in which—

Figure 1 represents a side elevation of a disk furrow opener, grain boot and drag-bar embodying my invention. Fig. 2 is a cross section of Fig. 1 on line A—B. Fig. 3 is an enlarged detail showing the manner of mounting the disk upon its support. Fig. 4 is a cross section of Fig. 3 on line C—D. Fig. 5 is a sectional detail of the adjusting mechanism; and Fig. 6 is a detached sectional detail of a part of the adjusting mechanism.

Similar reference numerals designate like parts throughout the several views.

1 is a disk furrow opener rotatably mounted upon a disk support 2, secured to the rear end of a drag-bar 3, by means of bolts 4.

5 represents a boot having a forwardly and downwardly projecting arm 6 near its upper end and a scraper 7 secured to the toe thereof and extending forward and upward therefrom toward the axis of the disk and adapted to contact therewith in a manner to free the surface thereof of any adhering material.

The lower end of the arm 6 is provided with a bearing surface, comprising an annular channel 8 adapted to receive a ring 9, having a face cam 10 and a projecting ear portion 11. The disk support 2 is provided with a projecting boss 12, and surrounding the boss is a face cam 13. The boss 12 is adapted to receive the ring 9 in a manner to cause the two face cams to contact with each other, and the ear portion 11 is provided with a laterally projecting tooth 11[1] adapted to engage with an annular toothed surface 14 forming part of the arm 6 outside of its cam surface. A bolt 15, axially arranged, secures the parts in position. The ring 9 may be rotated by means of the ear portion 11, and as it is rotated the opposing cam surfaces upon the ring and disk support operate to adjust the arm laterally bodily relative to the support, and the tooth upon the ring, engaging with the toothed surface upon the arm, together with the securing means, locks the operative parts of the adjusting mechanism in position. In this manner the grain boot may be adjusted bodily laterally relative to the disk support in a manner to cause the scraper device to press with more or less force against the surface of the disk.

What I claim as my invention, and desire to secure by Letters Patent, is:

1. A disk support for grain drills comprising, in combination, a disk, a support upon which said disk is rotatably mounted, a boot, means for securing said boot to said support, comprising a ring arranged between said members, said ring and one of said members having opposing cam surfaces adapted to produce relative lateral adjustment of said members when said ring is rotated.

2. A disk support for grain drills comprising, in combination, a disk, a support upon which said disk is rotatably mounted, a boot, means for securing said boot to said support, said means comprising a ring arranged between said members, said ring and one of said members having opposing cam surfaces adapted to produce relative lateral adjustment of said members when said ring is rotated, said ring and the other member having toothed surfaces adapted to engage with each other.

3. A disk support for grain drills comprising, in combination, a disk, a support upon which said disk is rotatably mounted, a boot, means for securing said boot to said support, said means comprising a ring arranged between said members, said ring and one of said members having opposing cam surfaces adapted to produce relative lateral adjustment of said members when said ring is rotated, said ring and the other member having toothed surfaces adapted to engage with each other, and a radially projecting ear upon said ring whereby it may be rotated.

4. A disk support for grain drills comprising, in combination, a disk, a support upon which said disk is rotatably mounted, a boot, an arm integral with said boot and extending forwardly and downwardly from the upper end thereof, a scraper secured to the toe of said boot and projecting forward and upward therefrom, a ring rotatably mounted upon said arm, its axis of rotation being substantially parallel with the axis of said disk, an annular cam forming part of said support, said ring having a cam surface adapted to contact with the cam on said support in a manner to produce a relative lateral adjustment of said arm and support when said ring is rotated.

ANDREW L. JOHNSON.

Witnesses:
JAS. M. SHEPARD,
T. N. DAGGETT.